(12) United States Patent
Ciancio et al.

(10) Patent No.: US 7,618,318 B2
(45) Date of Patent: Nov. 17, 2009

(54) REWARD SYSTEM

(75) Inventors: David Ciancio, Liberty Township, OH (US); Gregory J. Freeman, Murfreesboro, TN (US); Edward J. Korfhagen, Cincinnati, OH (US); James E. Schiesler, Milford, OH (US); Richard P. Stern, Union, KY (US); Stephen L. Wall, Loveland, OH (US); Adrian Coy, Cincinnati, OH (US); Simon Hay, Cincinnati, OH (US); Mark Hinds, Cincinnati, OH (US); Sarah Myatt, Cincinnati, OH (US)

(73) Assignee: The Kroger Co., Cincinnati, OH (US)

( * ) Notice: Subject to any disclaimer, the term of this patent is extended or adjusted under 35 U.S.C. 154(b) by 848 days.

(21) Appl. No.: 10/626,148

(22) Filed: Jul. 24, 2003

(65) Prior Publication Data

US 2004/0219971 A1 Nov. 4, 2004

Related U.S. Application Data

(60) Provisional application No. 60/398,644, filed on Jul. 25, 2002.

(51) Int. Cl.
G06Q 30/00 (2006.01)
G06Q 50/00 (2006.01)

(52) U.S. Cl. .............................. 463/25; 463/29; 705/14

(58) Field of Classification Search .................. 705/14, 705/10, 16, 21, 23; 463/25, 29; 700/231, 700/232, 236
See application file for complete search history.

(56) References Cited

U.S. PATENT DOCUMENTS

| 4,932,485 | A | | 6/1990 | Mori |
| 5,025,372 | A | * | 6/1991 | Burton et al. ................. 705/14 |
| 5,053,957 | A | * | 10/1991 | Suzuki ......................... 705/14 |
| 5,200,889 | A | | 4/1993 | Mori |
| 5,515,270 | A | * | 5/1996 | Weinblatt ..................... 705/14 |
| 5,710,886 | A | | 1/1998 | Christensen et al. |
| 5,791,991 | A | | 8/1998 | Small |
| RE36,116 | E | | 2/1999 | McCarthy |
| 5,945,653 | A | * | 8/1999 | Walker et al. ................ 235/380 |
| 6,014,634 | A | * | 1/2000 | Scroggie et al. ............... 705/14 |
| 6,018,718 | A | * | 1/2000 | Walker et al. ................. 705/14 |
| 6,026,370 | A | * | 2/2000 | Jermyn ........................ 705/14 |
| 6,035,280 | A | | 3/2000 | Christensen |
| 6,039,244 | A | | 3/2000 | Finsterwald |
| 6,049,778 | A | * | 4/2000 | Walker et al. ................. 705/14 |
| 6,055,573 | A | * | 4/2000 | Gardenswartz et al. ..... 709/224 |
| 6,128,599 | A | * | 10/2000 | Walker et al. ................. 705/14 |
| 6,185,541 | B1 | | 2/2001 | Scroggie et al. |
| 6,185,542 | B1 | * | 2/2001 | Moran et al. .................. 705/16 |
| 6,327,573 | B1 | * | 12/2001 | Walker et al. ................. 705/14 |
| 6,345,261 | B1 | | 2/2002 | Feidelson et al. |

(Continued)

OTHER PUBLICATIONS

R.E. Bucklin et al., "Commercial Use of UPC Scanner Data: Industry and Academic Perspectives," University of Florida, Marketing Science, vol. 18, No. 3, (1999).

(Continued)

Primary Examiner—Peter DungBa Vo
Assistant Examiner—Matthew D. Hoel
(74) Attorney, Agent, or Firm—Thompson Hine LLP

(57) ABSTRACT

A method for operating a reward program including the steps of establishing a plurality of product categories and receiving an indication of selected ones of the product categories. The method further includes the step of tracking customer purchases in at least the selected categories and providing a reward to the customer based at least in part upon customer purchases in the selected categories.

52 Claims, 5 Drawing Sheets

U.S. PATENT DOCUMENTS

| | | |
|---|---|---|
| 6,351,735 B1 | 2/2002 | Deaton et al. |
| 6,386,444 B1 | 5/2002 | Sullivan |
| 6,415,262 B1 * | 7/2002 | Walker et al. ............. 705/14 |
| 2002/0133408 A1 * | 9/2002 | Walker et al. ............. 705/14 |
| 2003/0033211 A1 * | 2/2003 | Haines et al. ............. 705/26 |

OTHER PUBLICATIONS

J.M. McCann, "*Baseline Modeling of Scanner Data,*" Fuqua School of Business Duke University (Mar. 1995).

D. Khazanchi t al., "Scanners: How one strategic technology has revolutionised the retailing business," (date unknown). Applicants admit the status of this publication as prior art for the limited purpose of examination of this application and reserve the right to challenge the status of this publication as prior art.

\* cited by examiner

Toothpaste.................... 2.20
Orange Juice ................. 2.89
Laundry Detergent .......... 7.80
Frozen Dinner ................ 3.43

Total ........................$43.22

REWARDS PROGRAM:

Amount of total qualifying
purchases (points) in this transaction:
$40.77

Total amount of qualifying purchases
(points) to date: $232.41

Total amount of qualifying purchases
(points) required to begin
accumulating rewards: $300

FIG. 2

Deordant ..................... 1.99
Shampoo ..................... 4.79
Potato Chips ................ 3.50
Ice Cream ................... 3.99

Total .......................$34.71

REWARDS PROGRAM:

Total amount of total qualifying
purchases (points) to date for:

Frozen Foods and Ice Cream: 15.50

Fresh Produce: 23.14

Pet Food and Supplies: 9.75

FIG. 3

REWARD SYSTEM

This application claims priority to U.S. Provisional Application Ser. No. 60/398,644, filed Jul. 25, 2002, the contents of which are hereby incorporated by reference.

The present invention is directed to a reward system, and more particularly, to a reward system which can provide a reward or rebate based upon customer purchases in selected product categories.

BACKGROUND

Reward or rebate systems may be used to reward customer loyalty and to provide incentives for additional customer visits. Many existing rebate systems calculate the reward based upon all of a customer's purchases and therefore such rebate systems do not target specific areas of interest to the customer.

SUMMARY

In one embodiment, the present invention is a reward system in which a plurality of product categories are created, and the customer, store, or other entity can select the product categories to which the program applies or in which the customer's reward will be generated or accumulated. In this manner, the categories in which the customer's reward is generated or credited can be controlled. The reward may be applied in a variety of forms (such as gift cards, electronic credit, coupons, gift certificates, etc.) and may be able to be applied to a variety of products or product categories.

In one embodiment, the invention is a method for operating a reward program including the steps of establishing a plurality of product categories and receiving an indication of selected ones of the product categories. The method further includes the step of tracking customer purchases in at least the selected categories and providing a reward to the customer based at least in part upon customer purchases in the selected categories. Other objects and advantages of the present invention will be apparent from the accompanying drawings and descriptions.

BRIEF DESCRIPTION OF THE DRAWINGS

FIG. 2 is a representative purchase receipt when a customer's account is below the purchase threshold; and FIG. 3 is a representative purchase receipt when a customer's account has surpassed the purchase threshold;

DETAILED DESCRIPTION

The rebate or reward system of the present invention may be implemented and run in a variety of manners. However, in one embodiment, a store or chain which implements the system may first select or define a plurality of product categories. The product categories may be relatively broad or narrow. For example in the case of a grocery store, categories such as "frozen foods and ice cream," "fresh produce," "pet food and supplies," etc. may be created and used. Although the number of product categories and the goods in each product category may vary, there may be, for example, from two product categories to about fifty product categories or more. In one illustrative embodiment (which will be followed herein) the number of product categories set up by the store or chain is nine.

The number of product categories and the products in each product category may be determined by a variety of methods. In one embodiment, the store or chain may conduct studies or data mining to determine which products or product categories will be used and to determine how the products and product categories should be arranged to provide the most benefit to the store and/or its customers. The categories may be selected to provide a mixture of product categories by sales volume. For example, some of the product categories may include primarily high volume sale products and others of the product categories may include primarily low volume sales products so that sales of the low volumes products may be able to be encouraged. As another example, the product categories may include a mixture of high and low volume products. The product categories may be selected such that the grouping of products in each product category is familiar to, and easily recognized by, the customers.

Figure 1:
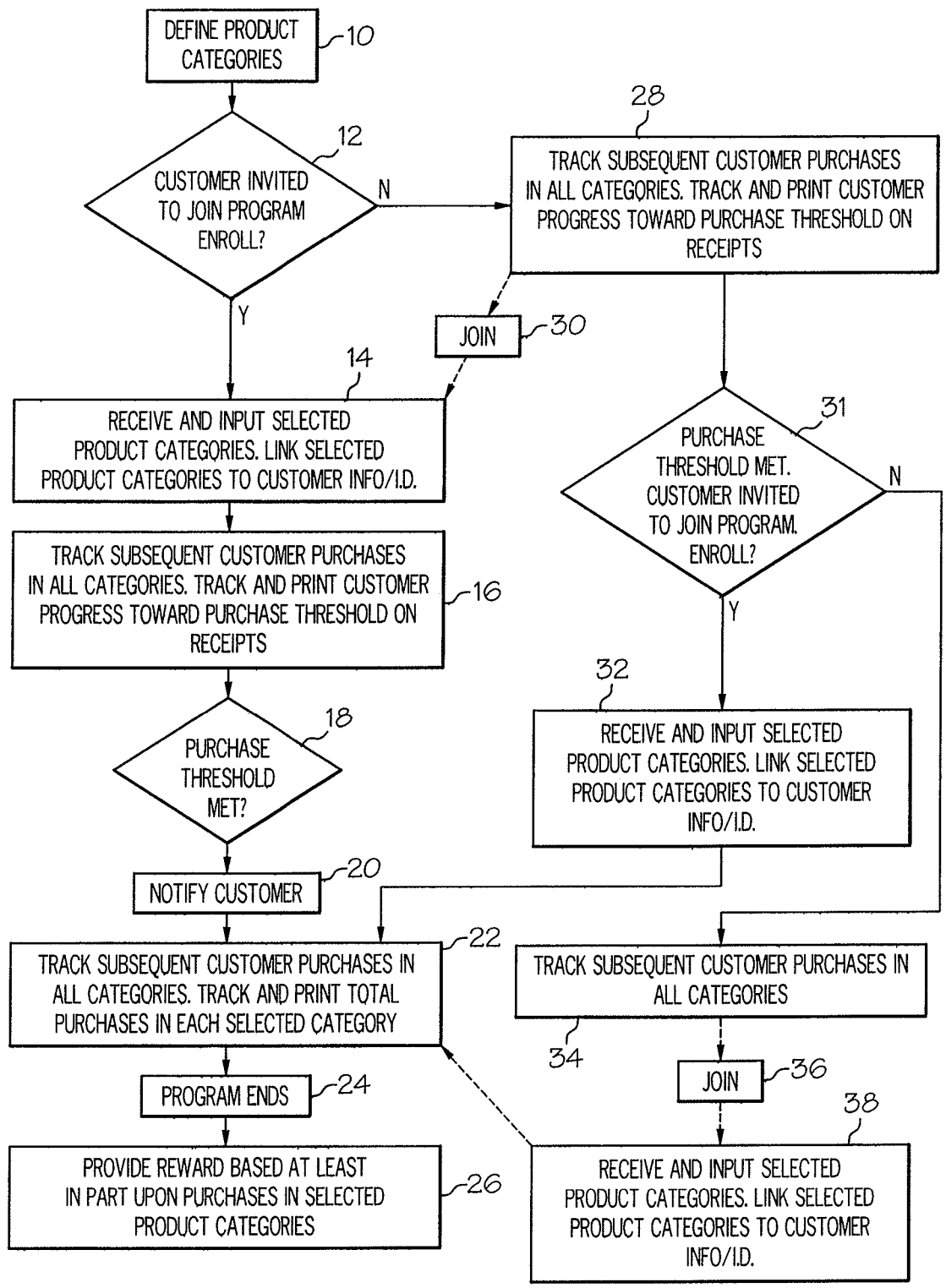
FIG. 1 is a flow chart illustrating one embodiment of the system of the present invention.

Once the store or chain has determined the number and makeup of the product categories (shown as step 10 in FIG. 1), customers may then be invited to sign up for the program (step 12) in which the customers can receive rewards. For example, the store or chain may provide a booth, kiosk, table, display area or the like located inside the store (or elsewhere) which includes promotional displays providing information about the program. Customers may also be able to join the program at checkout with the assistance of a cashier, at self-checkout systems, at a kiosk, or by an interactive telephone or voice activation system. Customers may also be able to join the program through various other methods including, but not limited to, regular mail, e-mail, via the internet or web page interaction, etc.

When a customer joins the program, the customer may be provided with a list of the predefined product categories and may be invited to select any number of the product categories (step 14). For example, when the store offers nine product categories, the customer may have the option to select three of the nine product categories. Alternately, the store or some other entity may select the product categories for the customer. For example, the store may examine past customer purchases and behavior and select categories in which the customer has been an active purchaser, or select categories in which the customer has not been an active purchaser, or some other combination chosen by this or any other methodology.

Once the product categories have been selected, the selected product categories may be linked to the customer (step 14). The store may already have an existing customer rebate or customer rewards program with an associated identification card (such as a shopper's card or a loyalty card) and account number assigned to each participating customer. In this case, in order to link the selected product categories to the customer, the customer may produce his or her existing customer rewards identification card and a store employee can scan the identification card by using a radio frequency bar code scanner (such as a hand held scanner), or the like, to access the customer information.

After scanning a customer rewards program card, the customer may select or be assigned an "alternate ID," such as a 7-10 digit identifier, in order to provide an additional security measure or identifying means. The alternate ID may operate as a personal identification number for the customer's account. Thus, for example, when it is subsequently desired to obtain a customer's information or identity for participation in the program, the may customer provide his or her alternate ID to the store.

If the customer is a member of a store's existing rewards program and does not have his or her identification card, or is not a member of an existing customer rewards program, or if the store does not have a customer rewards program, the customer may provide other identifying information. The desired customer information (i.e., name, address, phone number, e-mail address, family members, etc.) may be collected by a store employee (i.e., by customer interviews or providing a data sheet or web page for the customer to fill out). The customer may also be assigned or choose an alternate ID at this time.

Once the customer information has been collected and/or the customer has been identified, the customer's selected product categories may be linked to the customer or customer's account. Any of a wide variety of means or methods may be used for linking the customer or customer account to the selected categories. For example, a store employee can hand write a code corresponding to the selected categories onto a customer data sheet for subsequent processing. The employee may also enter a code or text in the store computer system. The customer may also hand write a code onto a data sheet and provide the sheet to the store or store employee (which may constitute "receiving" the selected product categories). The store or store employee can then enter the selected products categories into the store's system or computer (which may constitute "recognizing" the selected product categories). In one embodiment, a store employee may have access to a plurality of bar codes, with each bar code corresponding to one of the product categories. Once the customer selects or identifies the desired product categories, the store employee may scan (i.e., by using a bar code scanner or the like) the bar codes which correspond to the selected product categories (i.e., the three selected product categories) to link the selected product categories to the customer's account.

After the customer joins the program and selects the product categories, all the customer's purchases from the time of joining, as well as the purchases broken down by product category, may be tracked (step 16). This tracking may include recording each purchase in a database that is classified or arranged by customer identification and/or by product category. In one embodiment, the shelf tags and/or products located inside the store may include identifying information, such as color-coded tags, in order to communicate in which product category each product is classified.

The store or chain may set a purchase threshold which a customer must meet within a predetermined time period before the customer can begin to accumulate rebates or rewards. The threshold purchase amount may be selected in order to provide an optimum level which provides sufficient incentive and rewards to customers and/or benefit to the store, and may be selected by data analysis or data mining. The purchase threshold may be set at $0, which is of course equivalent to not having a purchase threshold.

For example, in the illustrative example, the purchase threshold is set at $300. For subsequent purchases after joining the program, the total qualifying purchases for each customer in relation to the purchase threshold may be printed on the customer's receipt so that the customer can track his or her progress towards the purchase threshold (see FIG. 2). Of course, the customer's progress towards the purchase threshold can be communicated in any of a wide variety of other manners, including but not limited to e-mail, web page, mailed flyers and the like.

In the case of groceries, certain purchases may be excluded from the purchases which may qualify towards meeting the purchase threshold (as well as being excluded from the program as a whole) such as, for example, alcohol, milk, tobacco products, etc. Although all the customer's purchases (excluding specifically exempted purchases) may be considered as counting toward reaching the purchase threshold, it is also within the scope of the invention such that only selected products or products in selected product categories may count toward reaching the purchase threshold. Of course, various other manners of counting purchases toward the purchase threshold may also be used.

The running tally of total qualifying purchases for each customer relative to the threshold amount may be tracked and printed on each customer's receipt, regardless of whether the customer has joined the program. In this manner, non-joined customers may be motivated to join the program when the customer reviews the information printed on his or her receipt. Thus, the purchases in each category may be tracked so that the customer may join the program at any time. For example, step 28 illustrates that the purchases of a non-joined customer may be tracked. If a customer subsequently joins the program (step 30), the customer may be invited to select the desired product categories (step 14) and the program continues as discussed below. Alternately, the customer may be entered into the program (also shown as step 30) at the discretion of the operating store without any affirmative action by the customer.

Once the customer has enrolled in the program and the customer's purchases reach or surpass the purchase threshold (step 18), the customer may be notified (step 20) and each of the customer's purchases in the selected product categories may be tracked and printed on the customer receipt for each subsequent visit (step 22). FIG. 3 illustrates a representative receipt for a customer at some time after passing the purchase threshold. The receipt can list the amount of total qualifying purchases (points) to date in each of the selected product categories. Furthermore, although not shown in FIG. 3, the receipt may also provide the amount of points generated in that transaction, or the amount of points in various other categories, or other information. Besides printing the pertinent information on each receipt, the status of or any information regarding each customer's account in the program may be communicated to the customer by various other means such as e-mail, web page, mailed flyers and the like. Depending upon the desires of the operating store, each purchase over the $300 threshold may begin accumulating rewards (that is, only purchases in the transaction that enable the customer to exceed the $300 threshold may count toward the rewards). Alternately, a customer may only begin accumulating rewards for any purchases that take place after the sales transaction which enables the customer to exceed the threshold.

Each of the purchases (points) in the selected product categories may be included in or excluded from the qualifying purchases which were incurred in reaching the threshold purchase, depending upon the desires of the individual store or chain. For example, if the purchases are retroactively included, each customer may have purchases credited in each of the selected categories immediately upon passing the purchase threshold. If the purchases are not retroactively included, each customer begins with a "zero balance" in each selected product category upon passing the purchase threshold.

For customers who have not joined the program, once the customer reaches the $300 threshold, the cashier for that purchase may be prompted (i.e., by sounds and/or a text message on the register or by other means) to inform the customer that the customer has reached the purchase threshold and invite the customer to join the program at that time (step 31). Besides or in addition to informing the customer orally, the customer's receipt may also be printed with a message informing the customer of his or her qualification (i.e., surpassing the purchase threshold) and inviting the customer to join the program. The message may also indicate that the customer should select the desired product categories. The customer's receipt may be printed with such a similar invitation message for a limited time (i.e., 7 days) after the customer reaches the purchase threshold. Alternately, the customer's receipt may be printed with the "invitation" message for a certain number of store visits by the customer after reaching or surpassing the purchase threshold. Customers may also be notified of the existence of the program, as well as their eligibility to begin earning rewards or rebates (i.e., purchase threshold has been met) by e-mail, web page notifications, regular mail, etc. If the customer joins at step 31, the product categories may be selected at step 32 and the program continues as described above and below.

As shown at step 34, purchases for "non-joined" and qualified customers may continue to be tracked, and the customers may join the program (step 36) after passing the purchase threshold. Alternately, the operating store may enroll the customers at some time after qualifying (at step 36) without any affirmative action by the customer. After joining the program at step 36, the selected product categories may then be chosen at step 38, and the program continues as described above and below.

As noted above, a non-joined customer may be entered into the program by the operating store at any time during operation of the program. A customer that is entered into the program at the operating store's decision may be able to participate in the program to the same degree as a customer that joins the program by his or her own decision, or such a customer may receive a different level of awards (i.e. proportional but reduced rewards) compared to a customer that affirmatively joins the program.

The program may be set up so that the customer can change his or her selected product categories at any time during the customer's participation in the program. For example, after joining the program the customer may review his or her receipt and notice that the purchases in one or more of the selected product categories are not as high as the customer had expected or hoped. In this case, the customer may desire to change the selected product categories. Thus, the program may be set up such that each of the customer's purchases in the product categories are tracked during the customer's participation in the program, so that the customer may switch his or her selected product categories and, if desired by the store, can retroactively gain the benefit of prior (as well as future) purchases in the newly selected categories.

Certain products or product categories may be designated as special or "bonus" products or product categories which can earn additional points for customers. For example, the store may determine that all purchases of pet products earn a number of points in the program proportional to twice the price of the products. In this manner, the store or chain can communicate the bonus products or product categories (i.e. pet products) to the customers and encourage the customers to purchase the bonus products or products in the bonus product categories.

The program may run for a predetermined amount of time (i.e., from a few hours or days to several years or more; in the example addressed herein the predetermined period of time is several months, such as three months). The predetermined amount of time may be specific to each individual customer, user or account, or can be commonly applied to all of the customers, users and accounts. When the predetermined amount of time has expired, the program ends (step 24), the customer's purchases in each selected category may be totaled, and a reward or rebate based upon the purchases in each selected category may be calculated (step 26). The reward or rebate may be calculated in any of a variety of manners according to the desires of the store or chain. In one embodiment, the reward or rebate may be calculated as a percentage of purchases in each of the selected product categories. For example, in one embodiment, the reward or rebate may be 10% of the total of each of the purchases in each of the selected product categories over the life of the program.

The reward or rebate may take a variety of forms. For example, in one embodiment, the reward or rebate may be a gift card (such as a rechargeable gift card), electronic credit, coupons, gift certificates, a net price discount (i.e. a price/unit discount) or the like. The reward or rebate may also simply be "store credit" that is good for specific goods, or is good for any purchase except specifically excluded goods. The reward or rebate may be a "delayed" reward, for example a coupon mailed to the customer, or offered as a "real time" reward that the customer may be able to use as credit in the same transaction in which qualifying purchases are made.

In some cases, the rebate or reward may only be able to be applied to the purchase of products in one or more product categories. For example, the portion of the reward that comes from a selected product category may, in some cases, only be able to be applied to purchases in that same product category in order to encourage the customer to continue purchasing in an active purchase area. Further alternately, the reward earned from purchases in one product group may only be applied to purchases in another product category in order to encourage a customer to broaden his or her areas of purchase.

In one embodiment, the rewards earned in one store or store chain may be able to be used or applied in a different store or store chain. For example, a grocery store chain may "partner" with a hardware store chain such that rewards earned by purchases at the in the stores of the grocery store chain may be able to be redeemed at the stores of the hardware chain, and vice versa (if desired). Of course, a wide variety of combinations of forms of the rebate and rewards can be envisioned and may be used without departing from the scope of the present invention.

The program may be set up and arranged such that the program runs during a relatively high volume sales period so that the customers may generate relatively high levels of rewards. The reward or rebate may be "time limited" such that the rewards or rebates earned during the program can only be used in a predetermined time period. Thus, the program can be set up so that the time period in which rebates or rewards may be used may be a relatively low volume sales period so that the relatively low volume sales period of the store can be boosted by additional customer visits and purchases.

Furthermore, although the program may be arranged to run in various cycles, the program may also be arranged to run continuously, but may have various or periodic "cut-off" points in which accumulated points or rewards are distributed to customers. Furthermore, when the program is run in cycles, customers that have previously joined the program may be automatically enrolled in the program for the next cycle without the need to affirmatively join the program each time.

The program may be run for a single store or for a chain of stores. When a chain of stores is running the program, the program may be common to all stores in the chain such that purchases for each customer in each store are tracked and stored in a single database.

The program can be run on an individual, household or other basis. In other words, each individual customer may include an account within the program, and a household of linked individuals may have their purchases and rewards grouped or aggregated in a household account. In this case, each individual may be linked to a specific household by obtaining information from the customer at the time of joining the program, after joining the program, or from pre-existing information stored in a customer rewards program account or the like.

The program may be run on a processor, CPU, computer, server or the like (collectively termed "computer" for the purposes of this application) that is linked to each store. The system may include a central computer, or a plurality of computers which are linked together (also collectively termed a "computer" for the purposes of this application). Each checkout registry or cash register or point of sale may be linked to the central computer, and the data for each purchase may be instantly transmitted to the central computer, or downloaded at regular intervals. Of course, the booth or kiosks (and bar code scanners) where customers can join the program may also be linked to the central computer or server. The central computer or server may be coupled to the World Wide Web or the Internet to allow information about the program to be accessed or transmitted by e-mail or over the Internet or World Wide Web.

The computer or computers may include software stored or located thereon, or readable thereby, for implementing and running the rewards program. For example, the software may include a tracking module for tracking the amounts of customer purchases in the product categories, and a calculating module for calculating a reward for each customer based at least in part upon the customer purchases in selected ones of the predetermined product categories. The tracking and calculating modules may also be able to implement the various other functions of the program discussed above. The tracking and calculating modules may be able to communicate with each other in order to transfer data therebetween. Further, although the tracking and calculating modules are termed "modules" herein, it should be understood that the modules need not be separate or separable, but are only broken down into modules herein in order to delineate the various functions of the modules and of the software as a whole.

Figure 4:
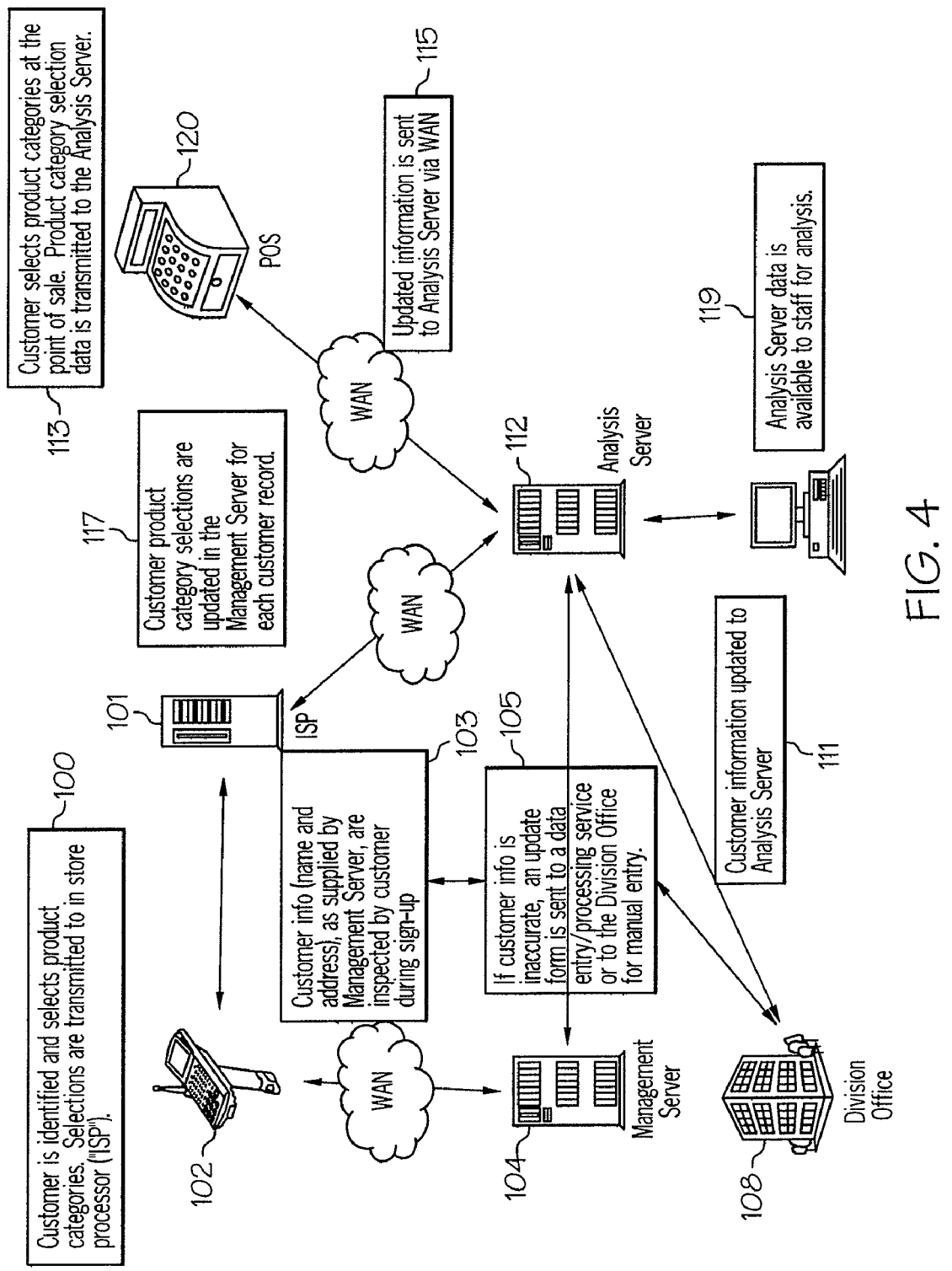
FIG. 4 is a system or block diagram illustrating various components of a system that may be used to carry out the enrollment component or steps of a reward program.
Figure 5:
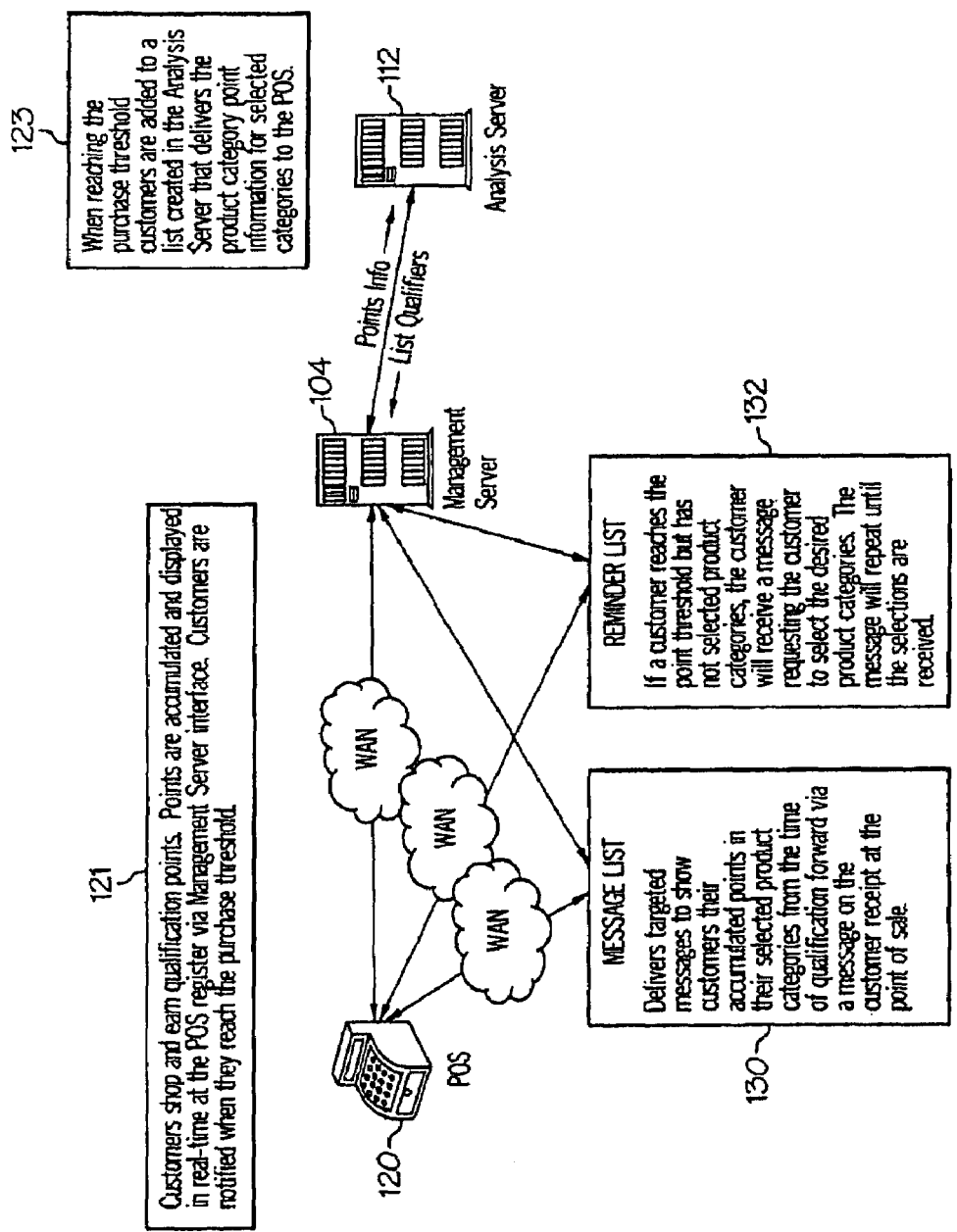
FIG. 5 is a system or block diagram illustrating various components of a system that may be used to carry out the qualifying component or steps of a reward program.
Figure 6:
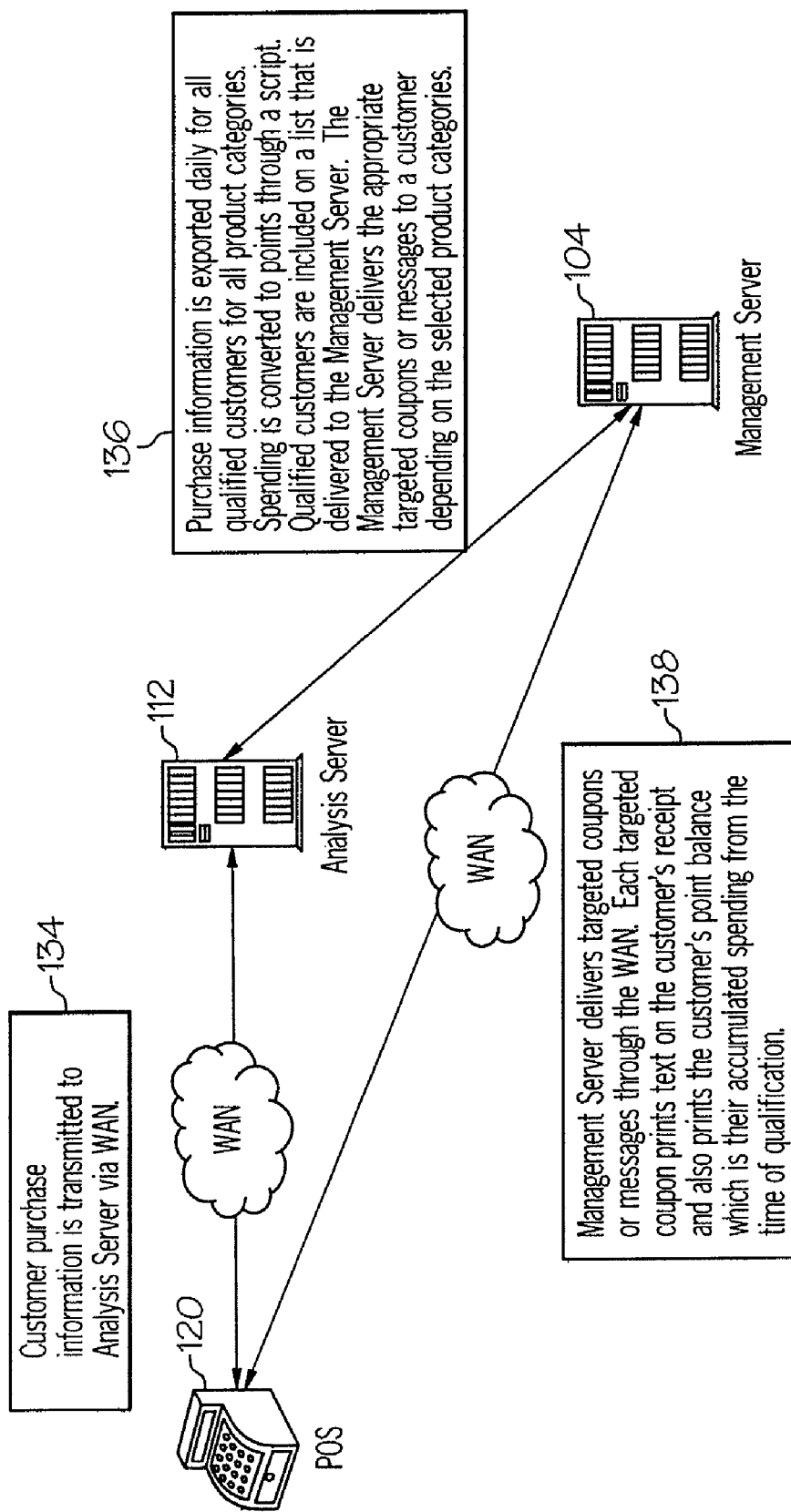
FIG. 6 is a system or block diagram illustrating various components of a system that may be used to carry out the reward component or steps of a reward program

FIGS. 4-6 illustrate various components of a system that may be used to run and implement the program and system described above. However, it should be understood that the system shown in FIGS. 4-6 are merely illustrative of one type or configuration of system, and the program can be set up and run in a variety of manners. Furthermore, it should be understood that for each of FIGS. 4-6, the system and connections shown therein are not necessarily rigidly structured, and can be presented or illustrated in a variety of manners with a variety of interconnection therebetween. For example, in each of FIGS. 4-6, nearly every component shown therein may be directly or indirectly connected to or be able to be connected to the other components or via a wide area network (WAN). However, for the sake of illustration, a variety of components are illustrated as being coupled together in a linear fashion when in fact each component may be interconnected in a web-like or hub-and-spoke fashion.

FIG. 4 illustrates various system components and steps that may be used during the enrollment phase of the program. At block 100 the customer data may be scanned and obtained, by example by a hand held scanner 102. The scanned data may then be transmitted to an in store processor (ISP) 101 and/or to a management server 104 via a wide area network (WAN). Alternately, the customer data may be transmitted to the management server 104 from the in store processor 101 via the WAN. The management server 104 may include a database management system, such as Target Expert which is sold by Valassis Relationship Marketing Systems, LLC of Shelton Conn. The database management system may be software or a database tool used to store customer information (such as customer identification, name, address, purchase history, etc.)

When a customer joins the program at block 100, the management server 104 may thus be accessed to pull customer information which the customer may inspect (block 103). If the customer determines that the stored data needs to be updated or corrected (block 105), an update form may be sent to a data entry/processing service or to the Division Office 108. Once the data entry/processing service or Division Office 108 receives the update form, the data entry/processing service or Division Office may manually or electronically update the customer records in the management server 104 or at analysis server 112. For example, at block 111 the customer name and address information may be updated in the analysis server 112 by information provided from the Division Office 108. The updated information may then also be communicated to the management server 104.

The analysis server 112 may include a database analysis or manipulation system, such as Market Expert sold by Valassis Relationship Marketing System. The database analysis or manipulation system may be software or a database tool used to evaluate, manipulate, or inspect data that is stored in the management server 104 or elsewhere. In this capacity, the management server 104 may act as a communication tool or interface between the in store processor 101 or point of sale terminal ("POS") 120 and the analysis server 112.

The in store processor 101 may be coupled to the analysis server 112 via a WAN. Furthermore, the point of sale terminals 120 such as checkout terminals, cash registers, computers etc. may be coupled to the analysis server 112 via a WAN. As shown at block 113, when a customer selects a product category at the point of sale, the selection or selections may be captured, such as by scanning a bar code, and the data may be periodically transmitted to the analysis server 112 by a customer transaction processing system or software. As shown at block 115, the data may be sent to the analysis server 112 via a WAN.

As shown at block 117, the customer's selection of product categories may be updated in the analysis server 112. Finally, as shown at block 119, the data stored on the analysis server 112 can be accessed by personnel at the store or chain to review and analyze such data.

As shown in FIG. 5, during the "qualifying" phase of the program each POS terminal 120 may be connected to the management server 104 by a WAN. As shown at block 121, points earned by the customer may be displayed at the register or POS 120 as supplied and tracked by the management server 104. The management server 104 may provide points or earnings information to the analysis server 112 which can track the product category rewards accumulation for each customer. When it is determined that a customer has reached the purchase threshold, the name or other identifying information for the customer may be transmitted to the point of sale 120 via the management server 104 from the analysis server 112 (block 123).

Each POS terminal 120 and the management server 104 may be connected to a Message List 130 which includes a list of customers and their accumulated spending or points in each category. Each POS terminal 120 and the management server 104 may also be connected to a Reminder List 132 which may include a list of customer that have reached the purchase threshold but not yet joined the program or selected the any product categories. The Message List 130 and Reminder List 132 may be maintained in the management server 104 as part of the software located thereon, or the lists 130, 132 may be located on other computers, servers or the like. When a customer completes a transaction at the point of sale 120 and the customer's name or other identifying information appears one of the lists 130, 132, the point of sale register 120 may be prompted to print out the appropriate message on the purchaser's receipt.

As shown in FIG. 6, during the "earning" phase of the program each POS terminal 120 may be connected to the analysis server 112 via a WAN such that as the customers shop, their purchase information (broken down by product, product category, amounts, time and date of purchase, etc.) may be transmitted to the analysis server 112 (block 134). The purchase information for each qualifying customer may then be regularly exported from the analysis server 112 to the management server 104 (block 136). The management server 104 may then deliver appropriate coupons, rewards or messages to the customer through the POS terminals 120 via the WAN (block 138).

The program may be used in any of a variety of stores or purchasing programs, including but not limited to grocery stores, drug stores, department stores, gas stations, on-line stores, etc.

What is claimed is:

1. A method for operating a reward program comprising the steps of:
   establishing or identifying a plurality of product categories;
   receiving from a customer an indication of consent to participate in the reward program;
   receiving by a computer system an indication of at least one selected product category;
   tracking, by said computer system, a customer's purchases in the at least one selected product category over a plurality of discrete purchase transactions for a given cycle of the reward program, which cycle has a starting point and an ending point, wherein the second receiving step and the tracking steps are carried out by a processor of said computer system according to software comprising computer-executable instructions on a computer-readable medium;
   processing a plurality of purchase transactions during said given cycle of the reward program in which said reward is accumulated but is not provided to said customer, said reward being accumulated over said plurality of purchase transactions in which said customer purchases at least one product in said at least one selected product category in each of said transactions;
   calculating, by said computer system, a reward for the given cycle of the reward program; and
   providing, at or after the ending point of the given cycle of the reward program, said reward to said customer which is based at least in part upon the monetary amount of the customer's cumulative purchases in the at least one selected product category after the starting point and before the ending point of the given cycle.

2. The method of claim 1 wherein said receiving step includes receiving an indication of said at least one selected product category as selected by a customer.

3. The method of claim 1 wherein said receiving step includes receiving an indication of said at least one product category as selected by an operating store.

4. The method of claim 1 wherein said at least one selected product category is less than all of said plurality of product categories.

5. The method of claim 1 wherein said reward is based solely upon purchases by said customer in the at least one selected product category.

6. The method of claim 1 wherein said tracking step includes tracking purchases of said customer in each of the plurality of product categories over a plurality of discrete purchase transactions.

7. The method of claim 1 wherein said second receiving step occurs before the start of said tracking step.

8. The method of claim 1 wherein said second receiving step occurs after the start of said tracking step.

9. The method of claim 1 wherein said providing step includes providing a reward only if a customer has made sufficient purchases that exceed a monetary purchase threshold.

10. The method of claim 9 wherein said reward is determined based upon customer purchases in said at least one selected product category that are made after said purchase threshold is exceeded.

11. The method of claim 9 wherein said customer is notified when or after said purchase threshold has been exceeded.

12. The method of claim 9 further comprising the step of printing, on a customer's purchase receipt, the total amount of the customer's purchases to date that qualify towards meeting the purchase threshold at least until the customer exceeds said purchase threshold.

13. The method of claim 1 wherein said reward is store credit, a coupon, a gift card, or a gift certificate.

14. The method of claim 1 wherein said reward is based at least in part upon a percentage of all or a portion of said customer's purchases only in said at least one selected product category.

15. The method of claim 1 further comprising the step of recognizing said at least one selected product category, said recognizing step including entering said at least one selected product category into said computer system.

16. The method of claim 15 wherein said recognizing step includes linking said at least one selected product category to a permanent customer account maintained beyond a specific transaction.

17. The method of claim 15 wherein said recognizing step includes scanning a bar code that is not associated with any goods being purchased or associated with any goods that are available for purchase.

18. The method of claim 1 wherein each product category in said establishing or identifying step includes a plurality of discrete products linked together by a store or chain to thereby define each product category, the method further comprising the step of marking products with indicia to indicate in which product category said marked products are classified.

19. The method of claim 1 further comprising the step of printing, on a customer's purchase receipt, the total amount of the customer's cumulative purchases over multiple purchase transaction to date in each of the at least one selected product categories.

20. The method of claim 1 further comprising the step of receiving an indication of at least one new selected product category, and wherein said providing step includes providing a reward to said customer based at least in part upon the customer's purchases in the at least one new selected category.

21. The method of claim 1 wherein said tracking step takes place over a selected period of time in which said reward is not provided, and wherein said providing step includes providing a reward that is time limited such that said reward can be used only for a limited period of time after said selected period of time.

22. The method of claim 1 wherein said program is operated during a time period of relatively high volume of sales, and wherein said reward is limited such that said reward can only be used during a time period of a relatively low volume of sales.

23. The method of claim 1 wherein both receiving steps, and said tracking, processing, calculating and providing steps are carried out for a plurality of customers.

24. The method of claim 1 further including the step of providing a plurality of checkout terminals located in at least one store and operatively coupled to said at least one computer system, wherein each checkout terminal identifies the products purchased by each customer and transfers such information to said computer system.

25. The method of claim 1 further including the step of providing a bar code scanner operatively coupled to said computer system, wherein said bar code scanner identifies the at least one selected product category.

26. The method of claim 1 wherein said computer-executable instructions include:
a tracking module for tracking the monetary amounts of customer purchases in the at least one selected product category for a plurality of customers for a plurality of discrete transactions; and
a calculating module for calculating, after said plurality of discrete transactions for the given cycle, the reward for each customer.

27. The method of claim 1 wherein said second receiving step is discrete and separate from a purchase transaction.

28. The method of claim 1 wherein said reward to said customer is based upon a plurality of discrete transactions.

29. The method of claim 1 wherein each product category in said establishing or identifying step includes a plurality of products linked together by a store or chain to thereby define each product category.

30. The method of claim 29 wherein each product category includes a relatively broad category of products and includes a plurality of differing products or goods included therein such that each product category is broader than any particular product or good individually available for purchase.

31. The method of claim 1 wherein said establishing or identifying step includes establishing, before a purchase transaction, a predefined number of product categories, wherein each product category includes a plurality of different types of products, and wherein the method further includes the step of, after said establishing or identifying step and prior to said second receiving step, a customer selecting one of said product categories.

32. The method of claim 1 wherein each discrete transaction constitutes a separate visit to the store or chain.

33. The method of claim 1 wherein said method is operated by a grocery store, and wherein said product categories are categories of products offered for sale by a grocery store.

34. The method of claim 1 wherein the reward has a monetary value that is directly based upon the monetary amount of the customer's purchases in the selected product categories over the given cycle of the reward program.

35. The method of claim 1 wherein each discrete transaction constitutes a separate visit to the store or chain, and wherein the reward is automatically provided to the customer at the end of the given cycle of the reward program without requiring any further action by the customer.

36. The method of claim 1 wherein no reward is provided to the customer over said plurality of transactions in which said reward is accumulated and increased, and wherein the reward provides an immediate and, tangible financial benefit to said customer.

37. The method of claim 1 wherein the value of said reward increases as a customer's cumulative purchases in the at least one selected product category increases.

38. The method of claim 1 wherein said tracking step includes tracking the customer's purchases via a barcode scanner at a point-of-sale terminal.

39. The method of claim 1 wherein said second receiving step includes receiving said indication by the processor of said computer system, according to software comprising computer-executable instructions on a computer-readable medium.

40. The method of claim 1 further comprising, after the establishing or identifying step, and before the second receiving step, simultaneously presenting a list of all product categories to said customer, and requesting said customer to select at least one product category for the purposes of said reward program.

41. The method of claim 1 wherein the number of product categories in said establishing or identifying step is between two and fifty.

42. The method of claim 1 wherein said reward is calculated by determining a percentage of a customer's purchases in the at least one selected product category over the given cycle of the reward program.

43. The method of claim 1 further comprising the steps of carrying out said tracking, processing, calculating and providing steps for another cycle of the reward program to provide another reward that is independent of any reward provided in the previous cycle.

44. The method of claim 1 wherein said processing step includes scanning the customer's purchases in the at least one selected product category at a point-of-sale terminal and transmitting identification of the purchases to said computer system.

45. The method of claim 1 wherein said at least one selected product category is selected by a customer for the purpose of participating in the reward program and receiving a reward.

46. The method of claim 1 wherein a selection of at least one product category by a customer constitutes said indication of consent to participate in the reward program.

47. The method of claim 1 wherein acceptance of said reward by a customer constitutes said indication of consent to participate in the reward program.

48. The method of claim 1 wherein said indication received by said computer system in said second receiving step is directly or indirectly provided to said computer system by said customer.

49. The method of claim 1 wherein said second receiving step includes receiving by said computer system an indication of a plurality of selected product categories, and wherein the providing step includes providing said reward to said customer which is based at least in part upon the monetary amount of the customer's cumulative purchases in the plurality of selected product categories during the given cycle.

50. The method of claim 1 wherein said computer system comprises a plurality of computers linked together.

51. The method of claim 1 wherein said computer system comprises a single computer.

52. The method of claim 1 wherein said starting point and said ending point are temporal in nature.

* * * * *